Patented Oct. 16, 1928.

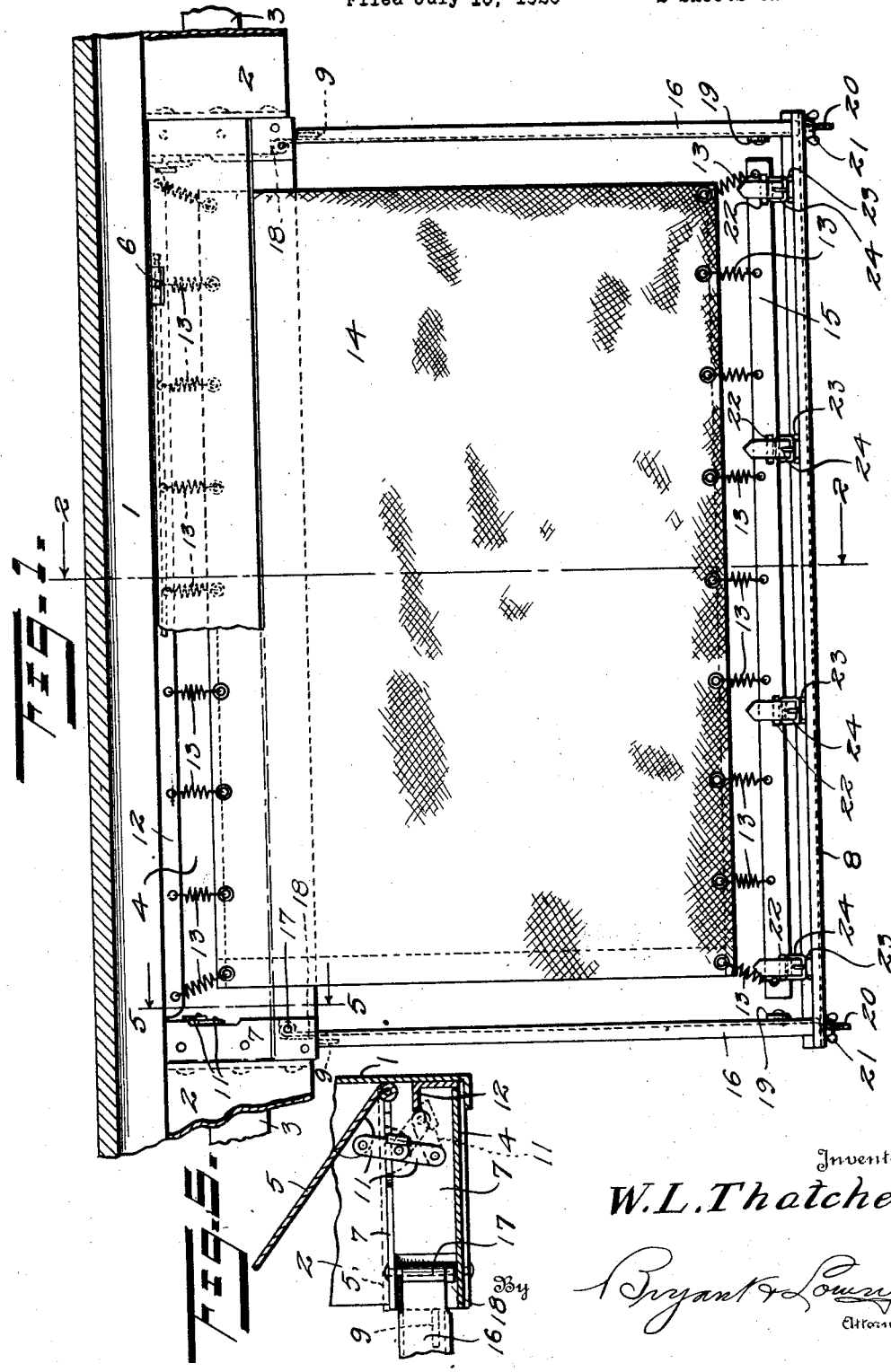

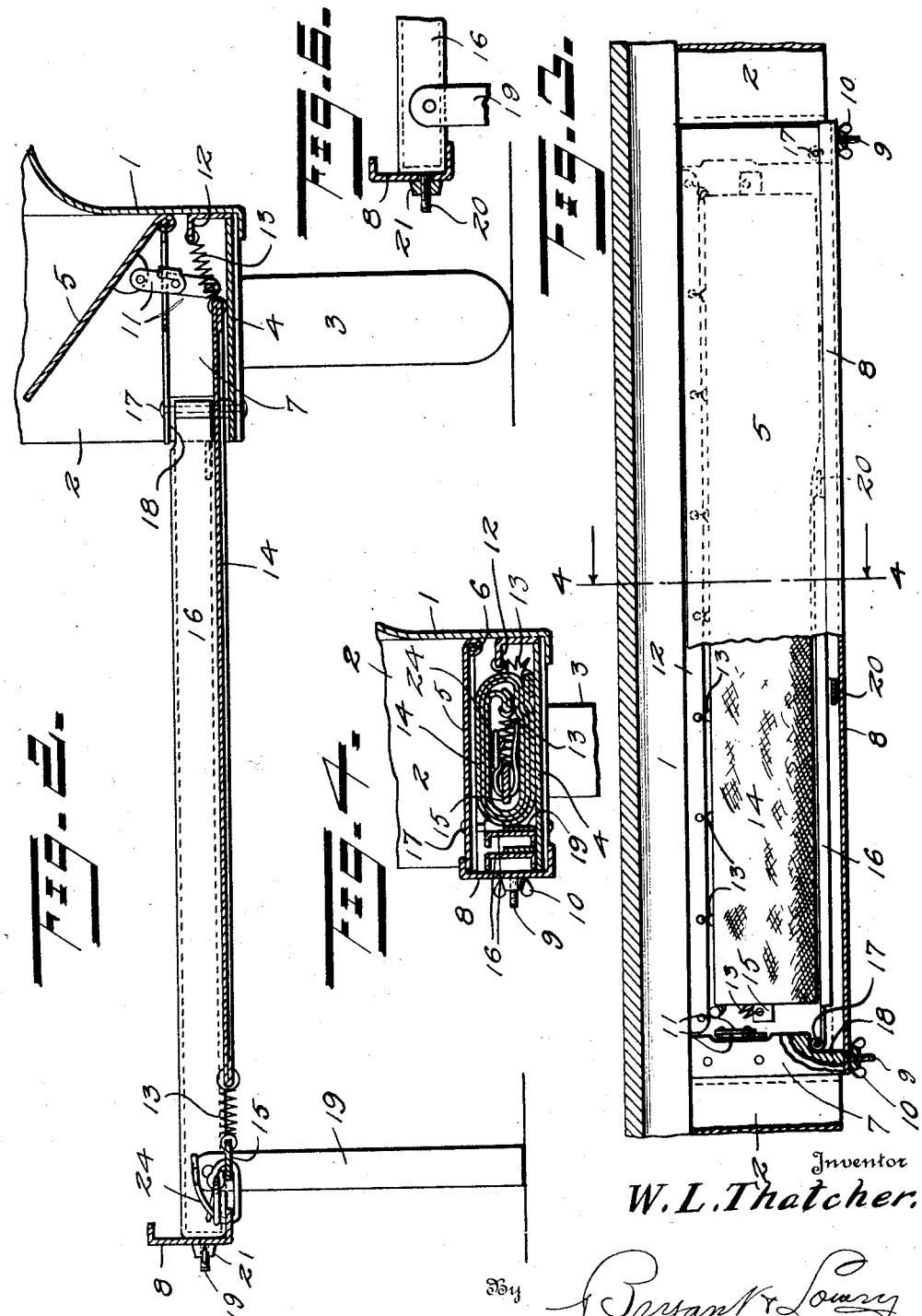

1,687,742

UNITED STATES PATENT OFFICE.

WILLIS L. THATCHER, OF SACRAMENTO, CALIFORNIA.

AUTOMOBILE BED.

Application filed July 15, 1926. Serial No. 122,682.

This invention relates to certain new and useful improvements in automobile beds and particularly to the type that rely upon the automobile as a partial support therefor when in set up condition.

The primary object of the invention is to provide an automobile bed embodying a canvas section constituting a bed bottom and a supporting frame for the ends and outer sides of the canvas section that are normally housed within a compartment beneath one of the side running boards of the automobile with the inner side of the bed supported by the running board when the bed is extended for use.

With the above and other objects in view that will become apparent as the nature of the invention is better understood, the same consists of the novel form, combination and arrangement of parts hereinafter more fully described, shown in the accompanying drawings and claimed.

In the drawing, wherein like reference characters designate corresponding parts throughout the several views, Figure 1 is a top plan view of a bed attached to an automobile with the part of the automobile body shown in section, the inner side of the bed being supported by the automobile adjacent the running board and with a collapsible frame for supporting the outer side and ends of the bed, Figure 2 is a vertical cross-sectional view taken on lines 2—2 of Fig. 1 showing the compartment in a side running board of the automobile with the cover wall thereof elevated and with the bed extended in its set up condition, Figure 3 is a fragmentary top plan view, partly broken away and shown in section with the bed in its folded and retracted position within the running board compartment, Figure 4 is a cross-sectional view taken on line 4—4 of Fig. 3, Figure 5 is a detail sectional view taken on line 5—5 of Fig. 1 showing the upper wall or step of the running board in its raised position and the leg devices for so retaining the same, and Figure 6 is a detail view, partly in section of one of the outer corners of the bed supporting frame.

A bed attachment for automobiles is associated with one of the side running boards of the automobile, the running board being modified in construction as shown more clearly in Figs. 2, 4 and 5 wherein the reference numeral 1 designates a portion of a side guard or fender adjacent the running board of the automobile, the reference numeral 2 designating a mudguard, while the automobile wheel is shown at 3. The running board is constructed to provide a compartment, the lower edge of the fender 1 constituting the rear wall thereof and further including a bottom wall 4, an upper running board wall or step 5 that is hinged at 6 at its inner edge adjacent the fender 1 and supported in a horizontal position by the end blocks 7 positioned between the bottom and top walls 4 and 5 as shown in Fig. 3. The outer side of the running board compartment is closed by the channel bar 8 that encloses the upper and lower walls of the running board compartment as shown in Fig. 4 and is retained in position by the stud screws 9 carried by the supporting blocks 7 and passing through openings in the channel bars for the reception of thumb nuts 10 or similar fastening devices. The step or top wall 5 of the running board may be retained in the open position shown in Figs. 2 and 5 by the link members 11 connecting the top wall 5 at each end thereof with the supporting blocks 7, said links being constructed to permit limited movement laterally of the longitudinal axes thereof for supporting the upper wall 5 in its raised position.

The said bottom is preferably in the form of a canvas sheet that is spring supported and includes an angle bar 12 within the running board compartment and anchored to the rear wall thereof, the projecting flange of the angle bar 12 having coil spring connections 13 with the adjacent edge of the said bottom canvas or similar sheet 14. The metallic strip or bar 15 has a similar spring connection 13 with the opposite side edge of the sheet 14, and when the bed is out of use, the same assumes a rolled condition as shown in Fig. 4 to be housed within the running board compartment.

Supporting devices for the bed bottom are provided when the bed is in an extended position as shown in Figs. 1 and 2 and includes end bars 16 of channel formation, one end of each bar 16 being hingedly connected as at 17 to an adjacent supporting block 7 within the cutaway portion 18 in said block as clearly shown in Fig. 5 while the free end of each end bar 16 carries a pivotally mounted leg 19. When the bed is in its folded condition housed within the running board compartment, the end bars 16 occupy overlapping positions within said compartment while the supporting legs 19 are moved to lie parallel with the carrying end bars.

When it is desired to set up the bed structure, the upper wall 5 of the running board compartment is elevated upon first removing the channel bars 8 and the end bars 16 are then swung outwardly with the legs 17 lowered to operative positions. The canvas bed bottom 14 is then extended and the bar 15 at the outer side edge of the bed bottom is moved to a position adjacent the channel bar 8, it being noted that the free ends of the end bars 6 carry stud screw extensions 20 that are extended thru the end openings in the channel bar and so retained in position by the thumb nuts 21 as shown in Fig. 1. The bar 15 is provided with spaced slots 22 and the lower flange of the channel bar 8 is correspondingly slotted as at 23 and through which slots 22 and 23, connecting straps 24 are inserted to provide a supporting connection between the outer side edge of the bed bottom 14 and the channel bar 8 that is employed for connecting the outer ends of the end bars 16. It will, therefore, be seen that a serviceable bed attachment for automobiles is herein provided, the same being substantial in structure and capable of supporting considerable weight while the canvas bed bottom 14 is spring-supported in the usual manner. When the bed is out of use, all elements thereof are collapsed and folded into the running board compartment to be entirely hidden from view and as the same occupies a minimum of space, the slight increase in size of one of the running boards to provide a compartment for the bed does not materially detract from the beauty and artistic design of the automobile.

While there is herein shown and described the preferred embodiment of the present invention, it is nevertheless to be understood that minor changes may be made therein without departing from the spirit and scope of the invention as claimed.

What is claimed is:—

In a bed attachment for automobiles, a running board of compartment construction, a pair of end bars, each hinged at one end to an end wall of the compartment, a supporting leg hinged to the free end of each end bar, a removable channel bar at the outer side of the compartment adapted to connect the outer ends of the end bars when extended and set up and to close the outer side of the compartment when the bed is folded, a flexible bed bottom extending between the rear wall of the compartment and the channel bar, detachable strap connections between the outer edge of the flexible bed bottom and the channel bar, a step cover for the running board compartment and link connections between the cover and walls of the compartment to hold the cover in an inclined open position the said channel bar having flanges which embrace the step cover and bottom of the compartment when the compartment is closed.

In testimony whereof I affix my signature.

WILLIS L. THATCHER.